United States Patent [19]
Fujita et al.

[11] Patent Number: 6,018,685
[45] Date of Patent: Jan. 25, 2000

[54] POSITION CONTROL SYSTEM

[75] Inventors: Jun Fujita, Mishima; Tomoo Hayashi, Gotenba; Masaru Suzuki, Mishima; Masahiro Akiyama, Numazu, all of Japan

[73] Assignee: Toshiba Kikai Kabushiki Kaisha, Tokyo, Japan

[21] Appl. No.: 08/915,733

[22] Filed: Aug. 21, 1997

[30] Foreign Application Priority Data

Aug. 22, 1996 [JP] Japan ..................... 8-221615

[51] Int. Cl.⁷ ............ G05B 19/19; G05B 19/18; G05B 19/46; G05B 19/423
[52] U.S. Cl. ............... 700/61; 700/56; 700/57; 700/58; 700/64; 318/560
[58] Field of Search .......... 364/167.02, 167.03, 364/167.04, 167.05, 167.06, 167.07, 167.08, 167.09, 167.1, 167.11, 167.12, 528.37; 318/560

[56] References Cited

U.S. PATENT DOCUMENTS

| | | | |
|---|---|---|---|
| 3,666,123 | 5/1972 | Tornheim | 214/77 |
| 4,696,707 | 9/1987 | Lewis et al. | 156/64 |
| 5,117,348 | 5/1992 | Romero et al. | 364/167.01 |
| 5,153,490 | 10/1992 | Ueta et al. | 318/571 |
| 5,164,896 | 11/1992 | Nagayasu | 364/167.01 |
| 5,194,790 | 3/1993 | Niimi | 318/567 |
| 5,371,450 | 12/1994 | Hiraoka | 318/560 |

Primary Examiner—William Grant
Assistant Examiner—Iván Calcaño
Attorney, Agent, or Firm—Pillsbury Madison & Sutro LLP

[57] ABSTRACT

A position control system, capable of correcting the positional deviation between mechanically related control axes. The position control system comprises a structural body having a Y-shaft supported by a fixed member so that two end portions can move in a vertical direction and a main shaft provided in this shaft so that it can move in a horizontal direction, servo motors for driving the two end portions, a servo motor for driving the main shaft, and a control device for performing the servo control of the servo motors. The control device adjusts the positions of the two end portions of the Y-shaft in accordance with the position of the main shaft with respect to the Y-shaft at the position control to correct the positional deviation from the target position of the main shaft in the vertical direction.

19 Claims, 10 Drawing Sheets

POSITION CONTROL SYSTEM

BACKGROUND OF THE INVENTION

1. Field of the Invention

The present invention relates to a position control system in for example a numerical control system or industrial robot system, more particularly relates to a position control system capable of correcting positional deviation caused between a position of a controlled object and a target position with a high precision in accordance with a change of the relative positional relationship between mechanically related control axes.

2. Description of the Related Art

For example, in the position control of a numerical control machine tool, usually the position control of the cutting tool etc. is carried out by detecting the rotational position of the servo motor for driving a shaft for moving the cutting tool etc. by a rotation detector attached to the servo motor and controlling the rotation of the servo motor based on this detected value.

In such a numerical control machine tool, there are cases where even if the control of the rotation the servo motor is correctly carried out, correct position control of the cutting tool etc. cannot be carried out due to elastic deformation etc. caused in the mechanical elements constituting the machine tool.

There are methods for solving this problem, however, they are imprecise and complicated and involve other problems.

SUMMARY OF THE INVENTION

An object of the present invention is to provide a position control system capable of precisely and simply correcting the positional deviation in a position control system of a machine tool, industrial robot, etc. in which the positional deviation between the position of the control point of the controlled object and the target position changes in accordance with the change of the relative positional relationship between mechanically related control axes.

A position control system according to the present invention comprises a structural body having a first moveable member supported by a fixed member so that its two end portions can move in a vertical direction and a second moveable member provided in this first moveable member in a manner so that it can move in a horizontal direction; first and second driving means for driving the two end portions of the first moveable member; a third driving means for driving the second moveable member; and a position controlling means for performing servo control of the first to third driving means, wherein the position controlling means adjusts the positions of the two end portions of the first moveable member in accordance with the position of the second moveable member with respect to the first moveable member by the first and second driving means when performing the servo control of the first to third driving means to correct the positional deviation from the target position of the second moveable member in the vertical direction.

In the position control system according to the present invention, preferably, the position controlling means has a position instructing means for outputting position commands to the first to third driving means; a servo controlling means for performing feedback control for the driving means based on the position commands from this position instructing means and position feedback signals from the first to third driving means; and a position correcting means for holding the position correction data of the two end portions of the first moveable member corresponding to a plurality of positions of the second moveable member in the horizontal direction, calculating the position corrections at positions of the two end portions of the first moveable member in accordance with the position of the second moveable member in the horizontal direction by interpolating the position correction data when performing the servo control of the first to third driving means, adding them to the position commands with respect to the first and second driving means, and respectively inputting them to the servo controlling means of the first and second driving means.

In the position control system according to the present invention, when performing the servo control of the first to third driving means, the positions of the two end portions of the first moveable member are respectively adjusted in accordance with the position of the second moveable member with respect to the first moveable member by the first and second driving means, and the position deviation from the target position of the second moveable member in the vertical direction is corrected, therefore even if the positional deviation from the target position of the second moveable member in the vertical direction changes in accordance with the position of the second moveable member in the horizontal direction, the correction of the positional deviation will be carried out with a high precision.

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

Before describing the preferred embodiments, a more detailed example will be given of the related art with reference to the figures for background purposes.

As stated above, in a numerical control machine tool, there are cases where even if the control of the rotation of the servo motor is correctly carried out, correct position control of the cutting tool etc. cannot be carried out due to elastic deformation etc. caused in the mechanical elements constituting the machine tool.

Figure 1:
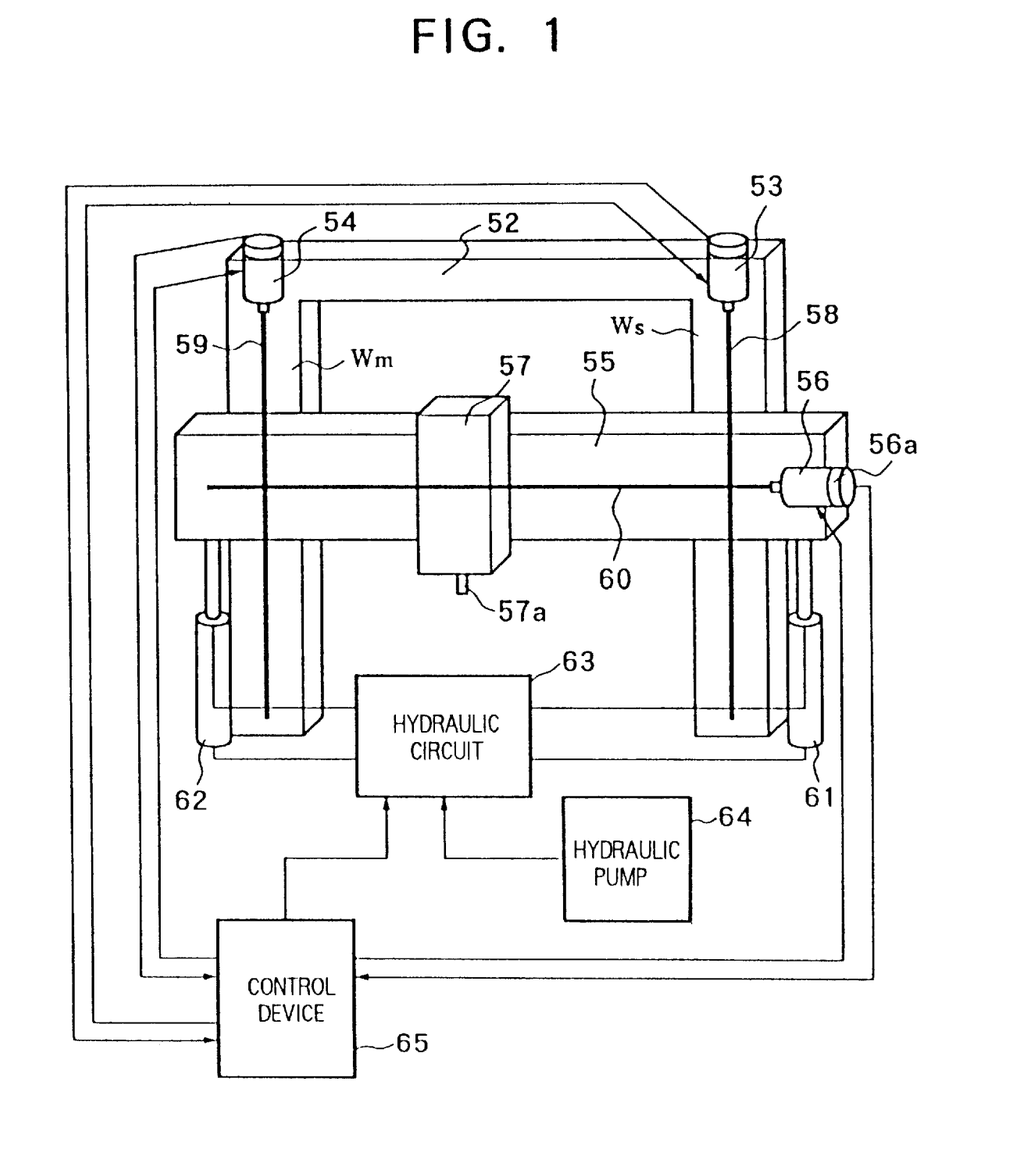
FIG. 1 is an explanatory view of an example of the configuration of a position control system of the related art in a gate type machining center.

For example, in the case of the gate type machining center shown in FIG. 1, a Y-shaft 55 is supported by a Wm axis and Ws axis of a gate type column 52 so that the two end portions can move so that it can further move in a vertical direction. A main shaft 57 is provided in the Y-shaft 55. Not illustrated male screw portions are respectively formed on two end portions of the Y-shaft 55, screw shafts 59 and 58 are respectively screwed onto them, and the screw shafts 59 and 58 are driven by servo motors 54 and 53. By this, the Y-shaft 55 moves in a vertical direction. Further, since the Y-shaft 55 has a considerably large weight, to cancel out this weight, the two ends of the Y-shaft 55 are supported by hydraulic cylinders 61 and 62. Note that, these hydraulic cylinders 61 and 62 are controlled by a hydraulic control circuit 63 and an hydraulic pump 64. The servo motors 53, 54, and 56 are controlled in rotation by a control device.

In the main shaft 57, a screw shaft 60 is screwed into the female screw portion formed in the main shaft 57. The screw shaft 60 is driven by the servo motor 56. By this, the main shaft 57 moves in the direction of the Y-shaft 55.

Accordingly, the position control of the too 57a attached to the front end of the main shaft 57 in the vertical direction is carried out by the servo motors 53 and 54 provided at the Wm axis and the Ws axis, while the position control of the horizontal direction (Y-axis direction) is carried out by the servo motor 56.

In the gate type machining center constituted as described above, even if the Y-shaft 55 is held at a constant position in the vertical direction, due to bending of the Y-shaft 55 due to the weight of the main shaft 57 and the elastic deformation of the screw shafts 58 and 59, the position of the tool 57a in the vertical direction changes in accordance with the positions of the main shaft 57 in the Y-shaft 55 direction and positional deviation with the target position. For this reason, there is a problem of a decline in the processing precision.

Figure 2:
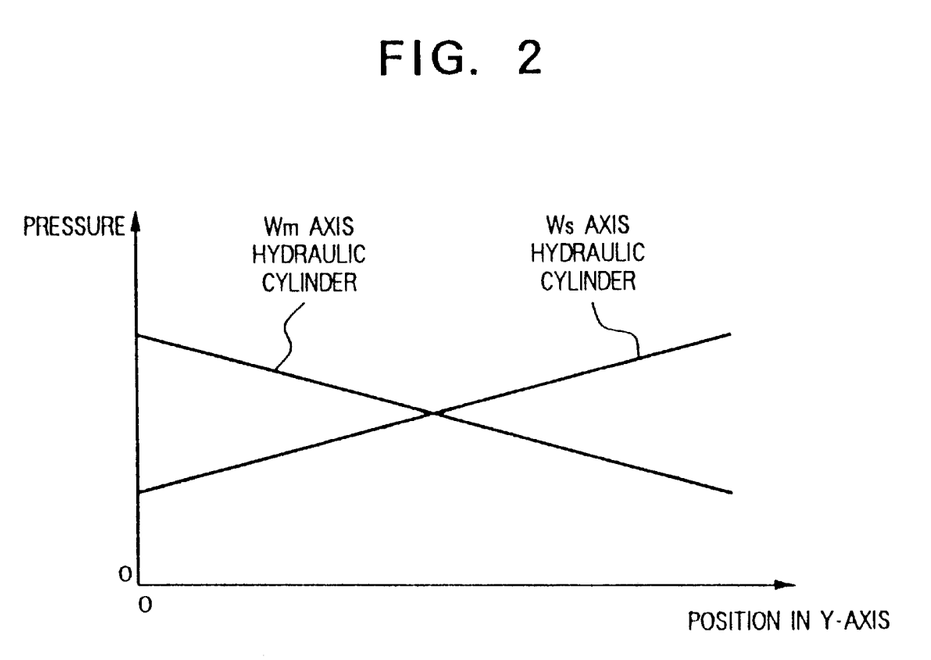
FIG. 2 is an explanatory view of an example of a pressure correction pattern in the gate type machining center shown in FIG. 8.

As a method for solving this problem, for example, as shown in FIG. 2, the hydraulics of the hydraulic cylinders 61 and 62 supporting the two ends of the Y-shaft 55 in accordance with the position of the main shaft 57 in the Y-axis direction are corrected so that the pressure of the hydraulic cylinder 62 becomes higher and the pressure of the hydraulic cylinder 61 becomes lower as the main shaft 57 approaches the Wm axis side and corrected so that the pressure of the hydraulic cylinder 62 becomes lower and the pressure of the hydraulic cylinder 61 becomes higher as the main shaft 57 approaches the Wm axis side.

Note that, the pressure correction pattern shown in FIG. 2 is obtained by adjusting the vertical directional position of the tool 57a by adjusting the pressure while measuring the front end position of the tool 57a at a plurality of positions of the main shaft 57 in the Y-axis direction at the time of assembly and adjustment of the gate type machining center.

Specifically, the positional information (pulse signal) in the Y-axis direction detected by a rotation detector 56a of the servo motor 56 is converted from a digital to analog format via a control device 65 and input to an analog hydraulic control circuit 63. In the hydraulic control circuit 63, based on the position information of this Y-axis direction, the hydraulics of the hydraulic cylinders 61 and 62 are controlled according to the pressure correction pattern shown in FIG. 2.

As a result of this, the position of the tool 57a in the vertical direction is maintained constant regardless of the position of the main shaft 57 in the Y-axis direction.

However, in this method, since the hydraulic control circuit 63 is an analog circuit, fine adjustment of the hydraulic is troublesome. Further, even if the adjustment is carried out one time, the correction becomes degraded with aging, so it is difficult to correct the positional deviation of the tool 57a with a high precision. Further, a special hydraulic control circuit and hydraulic parts etc. are necessary, so the cost of the apparatus becomes high. Further, since the correction of the hydraulic is realized by hardware, it is desired to be able to more quickly change or modify the hydraulic correction pattern.

Below, a detailed explanation will be made of the position control system according to an embodiment of the present invention by referring to the drawings.

Figure 3:
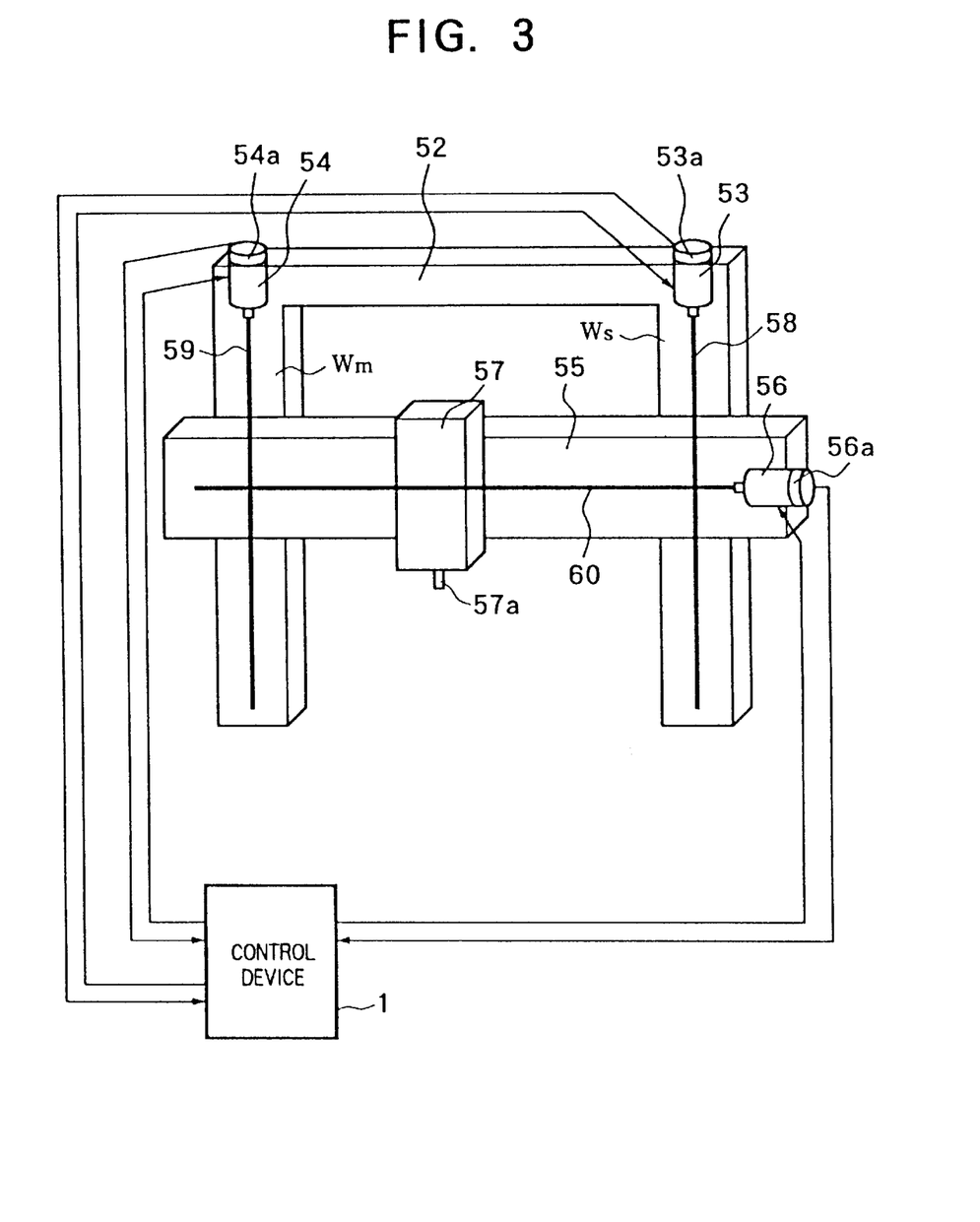
FIG. 3 is an explanatory view of the overall configuration of a position control system according to an embodiment of the present invention.

FIG. 3 is an explanatory view of the overall configuration of an embodiment of the position control system according to the present invention. Further, FIG. 4 is an explanatory view of an example of the configuration of a control device 1 of the position control system according to the present invention.

The gate type machining center shown in FIG. 3 has the same configuration as the gate type machining center shown in FIG. 1 except that the hydraulic cylinders 61 and 62, hydraulic control circuit 63, and hydraulic pump 64 do not exist.

Figure 4:
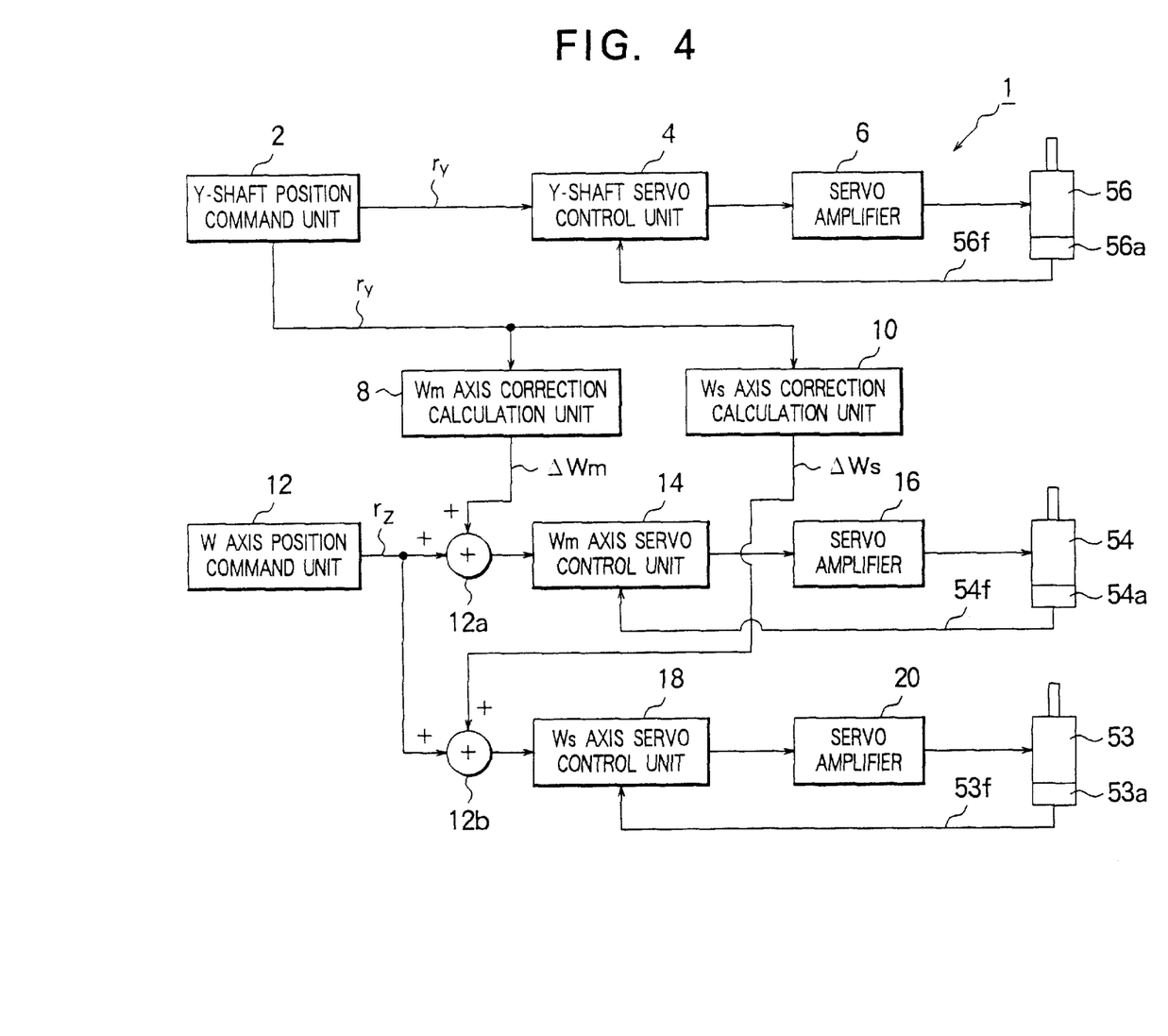
FIG. 4 is an explanatory view of an example of the configuration of a control device of the position control system according to the present invention.

In FIG. 4, the position control system 1 is basically constituted by a Y-axis control unit for controlling the Y-axis servo motor 56 and W-axis control unit for controlling the Wm axis servo motor 54 and the Ws axis servo motor 53.

The Y-axis control unit comprises a Y-axis position command unit 2, a Y-axis servo control unit 4, and a servo amplifier 6. A position command ry is output from the Y-axis position command unit 2 to the Y-axis servo control unit 4. In the Y-axis servo control unit 4, a current command is output to the servo amplifier 6 based on the position command ry and a position feedback signal 56f from the rotation amount detector 56a of the Y-axis servo motor 56. The drive current obtained by amplifying this current command is applied to the Y-axis servo motor 56 at the servo amplifier 6. By this, the rotation control of the Y-axis servo motor 56 is carried out.

The W-axis control unit comprises a W-axis position command unit 12, a Wm axis servo control unit 14, a Ws axis servo control unit 18, servo amplifiers 16 and 20, a Wm axis correction calculation unit 8, and a Ws axis correction calculation unit 10.

The position command rw is output from the W axis position command unit 12 to the Wm axis servo control unit 14 and the Ws axis servo control unit 18. In the Wm axis servo control unit 14 and the Ws axis servo control unit 18, based on the position command rz and the position feedback signals 54f and 53f from the rotation detector 54a of the Wm axis servo motor 54 and the rotation detector 53a of the Ws axis servo motor 53, the current commands are respectively output to the servo amplifiers 16 and 20. At the servo amplifiers 16 and 20, drive currents obtained by amplifying these current commands are respectively supplied to the Wm axis servo motor 54 and the Ws axis servo motor 53. By this, the rotation controls of the Wm axis servo motor 54 and the Ws axis servo motor 53 are respectively carried out.

On the other hand, the Wm axis correction calculation unit 8 and the Ws axis correction calculation unit 10 receive as input the position commands ry from the Y-axis position command unit 2. At the Wm axis correction calculation unit 8 and the Ws axis correction calculation unit 10, based on the position commands ry, the position corrections ΔWm and ΔWs are respectively calculated. They are respectively added to the position commands rz to be input to the Wm axis servo control unit 14 and the Ws axis servo control unit 18 at adder units 12a and 12b.

Not that the method of calculation of the position corrections ΔWm and ΔWs will be explained later. The functions of the control device 1 shown in FIG. 4 are realized by hardware having a configuration as shown in for example FIG. 5.

Figure 5:
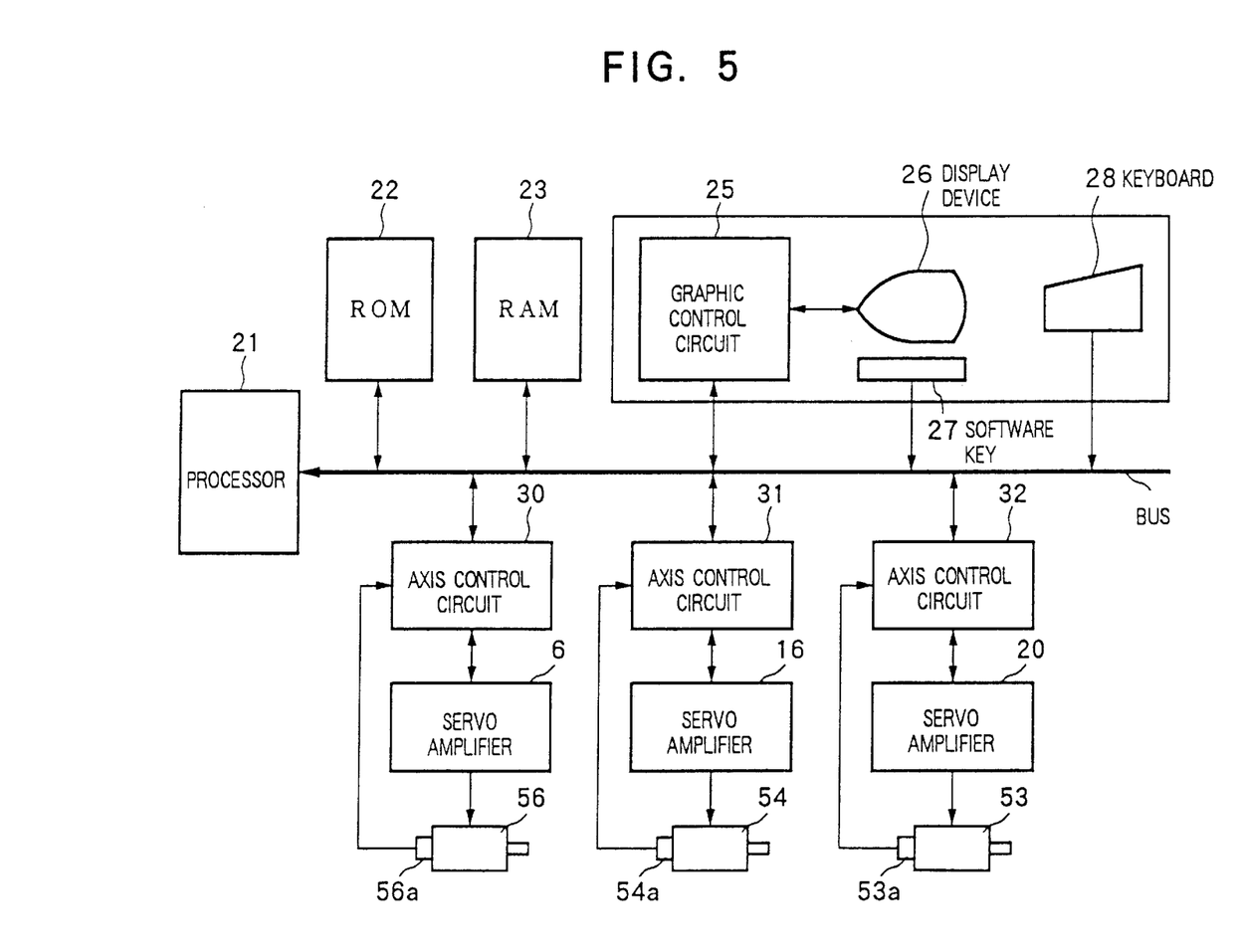
FIG. 5 is an explanatory view of an example of a hardware configuration of the control device of the position control system according to the present invention.

In FIG. 5, the processor 21 controls the entire position control system according to a system program stored in a ROM 22. In a RAM 23, various types of data or input/output signals are stored. For example, the correction data etc. mentioned later are stored.

A graphic control circuit 25 converts the digital signal to a signal for display and gives the same to the display device 26. As the display device 26, a CRT or a liquid crystal display is used. The display device 26 displays the shape, processing conditions, generated processing program, etc. when the processing program is prepared by a dialog format.

By inputting the data according to the content dialog data input screen) displayed on the display device 26, the processing program can be prepared.

On the screen, the work which can be handled at that screen or data is displayed in a menu format. Items on the menu are selected by depressing a software key 27 under the menu.

A keyboard 28 is used for inputting the required data to the position control system 1.

The axis control circuits 30, 31, and 32 are circuits for realizing the servo control units 4, 14, and 18 of the respective axes mentioned above, calculate the current commands from these position commands and position feedback signals of the respective servo motors in response to the position commands of the axes from the processor 21, and output them to the servo amplifiers 6, 16, and 20. The servo amplifiers 6, 16, and 26 output the drive currents obtained by amplifying the current commands to the servo motors 56, 54, and 53 as mentioned above.

Note that the servo control units 4, 14, and 18 of the axes can be realized not only by circuits, but also software.

Next, a detailed explanation will be made of the functions of the Wm axis correction calculation unit 8 and the Ws axis correction calculation unit 10 mentioned above.

Figure 6:
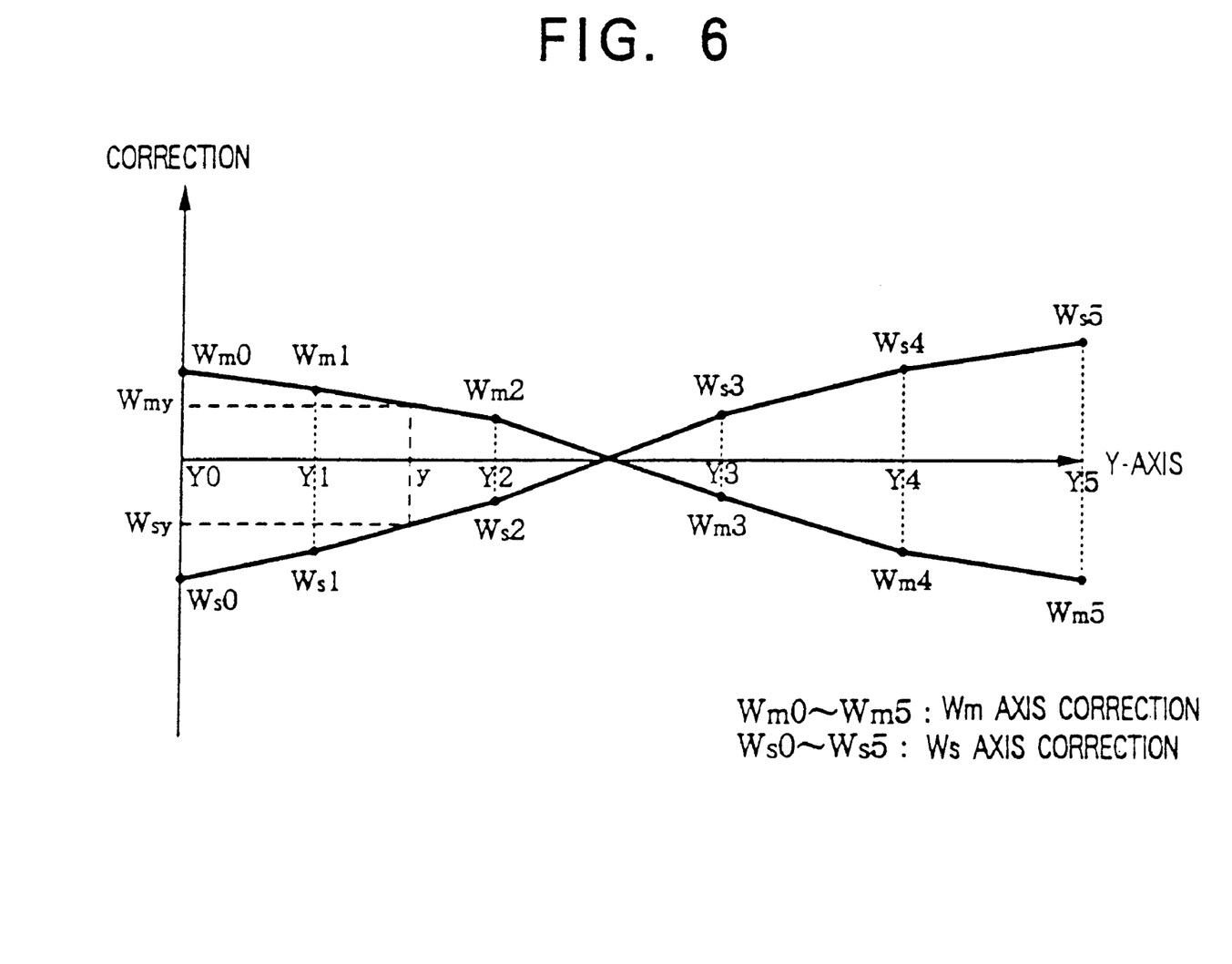
FIG. 6 is an explanatory view of an example of a correction pattern of a position correcting means in the position control system according to the present invention.

First, a correction pattern of the tool 57a of the main shaft 57 in the W-axis direction (vertical direction) as shown in FIG. 6 is prepared. The correction pattern shown in FIG. 6 shows the corrections (Wm0 to Wm5) of the Wm axis and the corrections (Ws0 to Ws5) of the Ws axis corresponding to the positions of the main shaft 57 in the Y-axis direction, for example, the position of y0 to y5.

At the time of assembly and adjustment of the gate type machining center shown in for example FIG. 3, the position of the main shaft 57 in the Y-axis direction is changed to y0 to y5, the position of the tool 57a in the W-axis direction is measured at these positions, and the corrections (wm0 to Wm5 and Ws0 to Ws5) to be made are found in advance.

Note that these corrections are stored in the RAM 23.

When performing the position control of the gate type machining center, the corrections (wm0 to Wm5 and Ws0 to Ws5) are subjected to for example straight line interpolation to calculate the corrections Wmy and Wsy of the Wm axis and Ws axis in accordance with the position y of the main shaft 57 in the Y-axis direction.

For example, where the main shaft 57 is located at the position y in the Y-axis direction, the corrections Wmy and Wsy are found from the following equations:

$$Wmy=Wmn+(y-yn).(Wmn+1-Wmn)/(yn+1-yn)(n=0,\ldots,5) \quad (1)$$

$$Wsy=Wsn+(y-yn).(Wsn+1-Wsn)/(yn+1-yn)(n=0,\ldots,5) \quad (2)$$

Accordingly, the Wm axis correction calculation unit 8 and the Ws axis correction calculation unit 10 read the corresponding correction data stored in the RAM 23 by referring to the position commands ry from the Y-axis position command unit 2 during the movement of the tool 57a.

Then, by using this correction data, the corrections wmy and wsy are calculated by Equation (1) and Equation (2).

Note that, in the present embodiment, the explanation was made of the case of straight line interpolation as the interpolation method, but the interpolation method is not limited to this in the present invention. Interpolation is also possible by the curve interpolation method using an exponential function, logarithmic function, spline function, etc.

Further, the position y of the main shaft 57 in the Y-axis direction is obtained from the position command ry from the Y-axis position command unit 2 as shown in FIG. 4, but it is also possible to obtain this from the position feedback signal from the rotation detector 56a of the Y-axis servo motor 56.

These corrections Wmy and Wsy are respectively added to the position command rz from the W axis position command unit 12 and are input to the Wm axis servo control unit 14 and the Ws axis servo control unit 18.

By this, the rotational positions of the Wm axis servo motor 54 and the Ws axis servo motor 53 are corrected, and the positional deviation of the tool 57a in the W-axis direction (vertical direction) is corrected.

As described above, by the position control system according to the present embodiment, the correction of the positional deviation of the main shaft 57 in the W-axis direction (vertical direction) is possible in accordance with the position of the main shaft 57 in the Y-axis direction, therefore the precision of the correction of the positional deviation of the main shaft 57 is improved.

Further, in the position control system according to the present embodiment, the correction date of the W-axis direction at a plurality of position of the main shaft 57 in the Y-axis direction are measured in advance. In an actual position control, the corrections Wmy and Wsy are calculated by performing straight line interpolation for these correction data, therefore the required capacity of the RAM 23 can be small.

Further, the correction data shown in FIG. 6 can be easily changed, so adjustment of the correction of the positional deviation is easy.

Further, if the positional deviation in the W-axis direction is corrected by using the position correcting means according to the present invention, as shown in FIG. 4, the position control of the main shaft 57 can be carried out with a high precision even if there is no hydraulic cylinder supporting the Y-axis of the gate type machining center.

Further, no complicated hydraulic control circuit, hydraulic cylinder, hydraulic pump, etc. are necessary, therefore it becomes possible to reduce the cost of the apparatus.

Figure 7:
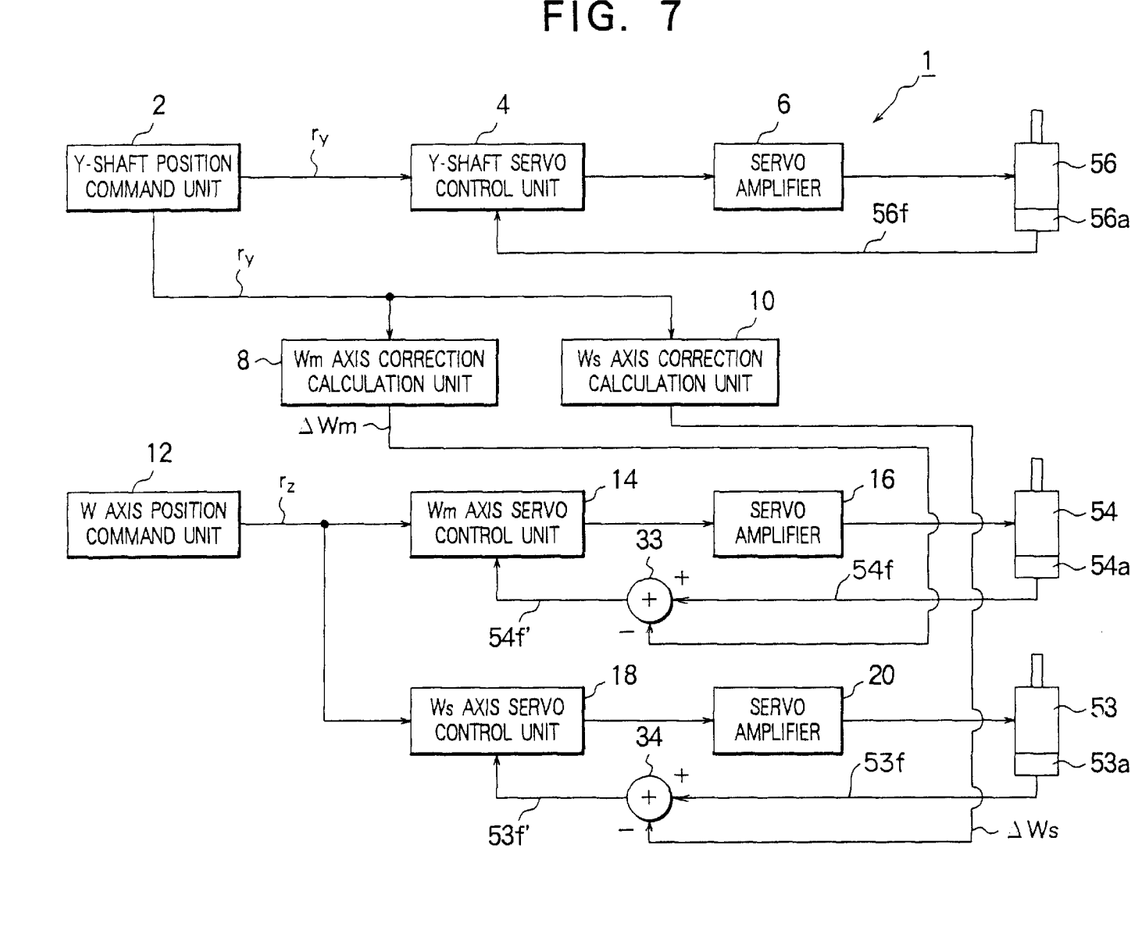
FIG. 7 is an explanatory view of an example of another configuration of the control device of the position control system according to the present invention.

Next, FIG. 7 is an explanatory view of an example of another configuration of the control device 1 in the position control system according to the present invention.

The difference between the control device 1 shown in FIG. 7 and the control device 1 shown in FIG. 4 resides in the fact that the corrections ΔWm and ΔWs calculated at the Wm axis correction calculation unit 8 and the Ws axis correction calculation unit 10 are not added to the position commands output from the W-axis position command unit 12, but are subtracted from the position feedback signals 54f and 53f of the rotation detectors 54a and 53a of the Wm axis servo motor 54 and the Ws axis servo motor 53 at subtraction units 33 and 34. The signals 54f' and 53f' are respectively input to the Wm axis servo control unit 14 and the Ws axis servo control unit 18.

By adopting such a configuration, in the same way as the control device 1 shown in FIG. 4, the correction of the positional deviation of the main shaft 57 in the W-axis direction (vertical direction) in accordance with the position of the main shaft 57 in the Y-axis direction becomes possible.

Figure 8:
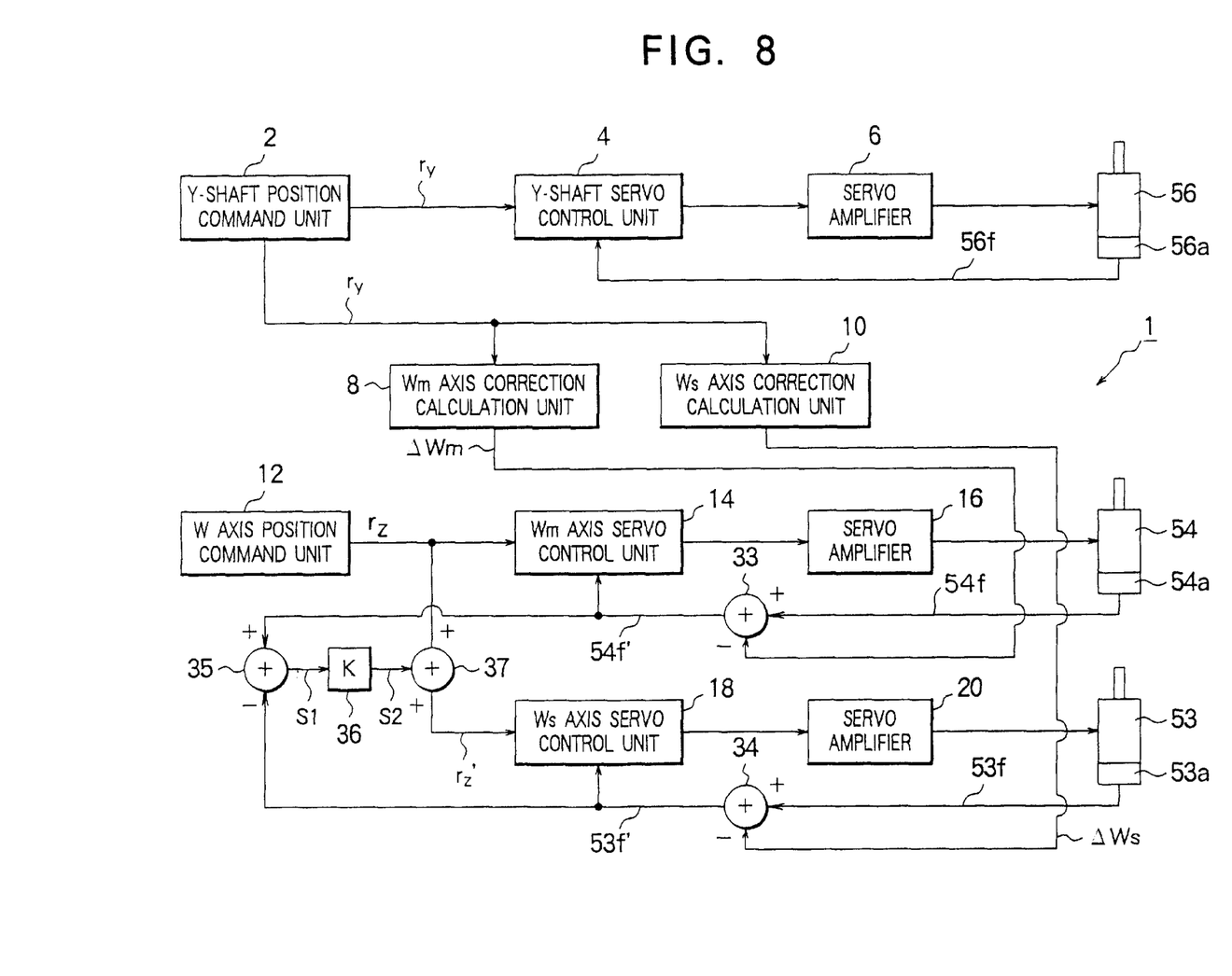
FIG. 8 is an explanatory view of an example of still another configuration of the control device of the position control system according to the present invention.

Next, FIG. 8 is an explanatory view of an example of still another configuration of the control device 1 in the position control system according to the present invention.

The control device 1 shown in FIG. 8 is basically the same as the control device 1 shown in FIG. 7 in the point that the corrections ΔWm and ΔWs of the Wm axis servo motor 54 and the Ws axis servo motor 53 are subtracted from the position feedback signals 54f and 53f of the rotation detectors 54a and 53a at the subtraction units 33 and 34, and these signals 54f' and 53f' are respectively input to the Wm axis servo control unit 14 and the Ws axis servo control unit 18.

However, in the configuration of the control device 1 shown in FIG. 8, the signals 54f' and 53f' are respectively input to the subtraction unit 35 where a difference S1 between the signals 54f' and 53f' is calculated, this is input to a gain unit 36 and multiplied by a predetermined coefficient to obtain a signal S2, and this is added to the position command rz at the adder unit 37 and input at rz' to the Ws axis servo control unit 18.

Such a configuration is adopted because the Wm axis servo motor 54 and the Ws axis servo motor 53 are independently corrected in the configuration of the control device 1 shown in FIG. 4 and FIG. 7, therefore, the balance between the position of the Wm axis direction and the position of the Ws axis direction sometimes becomes poor according to certain values of the corrections ΔWm and ΔWs.

For this reason, the position of the Ws axis direction is corrected by the signal obtained by multiplying the difference of the feedback signals and corrections between the Wm axis and the Ws axis by a predetermined gain so as to prevent the balance between the two from becoming bad.

Figure 9:
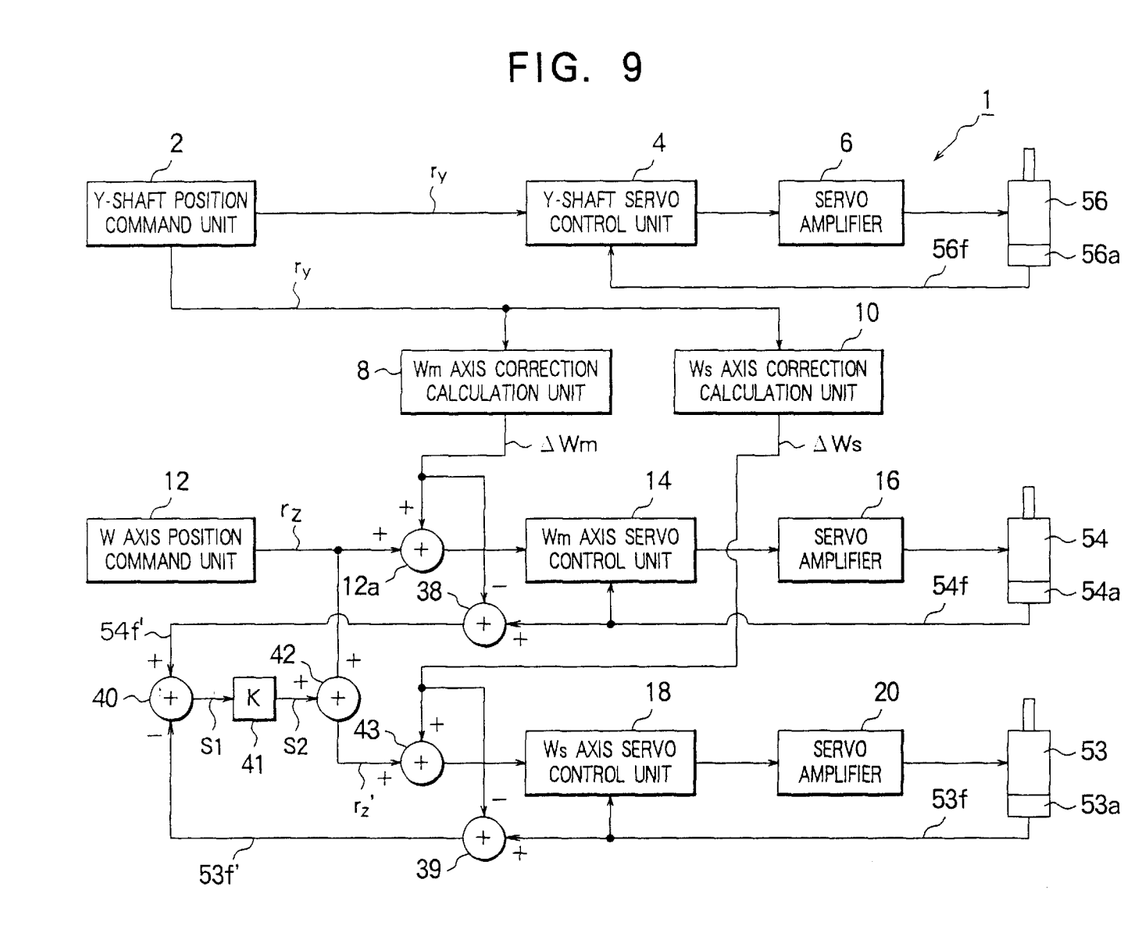
FIG. 9 is an explanatory view of an example of still another configuration of the control device of the position control system according to the present invention.

Next, FIG. 9 is an explanatory view of an example of still another configuration of the control device 1 in the position control system according to the present invention.

The configuration of the control device 1 shown in FIG. 9 is basically the same in the point that the corrections ΔWm and ΔWs of the Wm axis servo motor 54 and the Ws axis servo motor 53 are added to the position commands rw at the adder units 12a and 12b.

However, as mentioned by referring to FIG. 8, the balance between the position of the Wm axis direction and the position of the Ws axis direction sometimes becomes poor according to certain values of the corrections ΔWm and ΔWs.

Therefore, a configuration is adopted wherein the signals 54f' and 53f' are calculated at the subtraction units 38 and 39, a difference S1 between the signals 54f' and 53f' is calculated at the subtraction unit 40. This is input to the gain unit 41 and multiplied by a predetermined coefficient to obtain the signal S2, and this is added to the position command rz at an adder unit 42 and input as rz' to the Ws axis servo control unit 18. By such a configuration, similar functional effects to those by the control device 1 shown in FIG. 8 will be exhibited.

Figure 10:
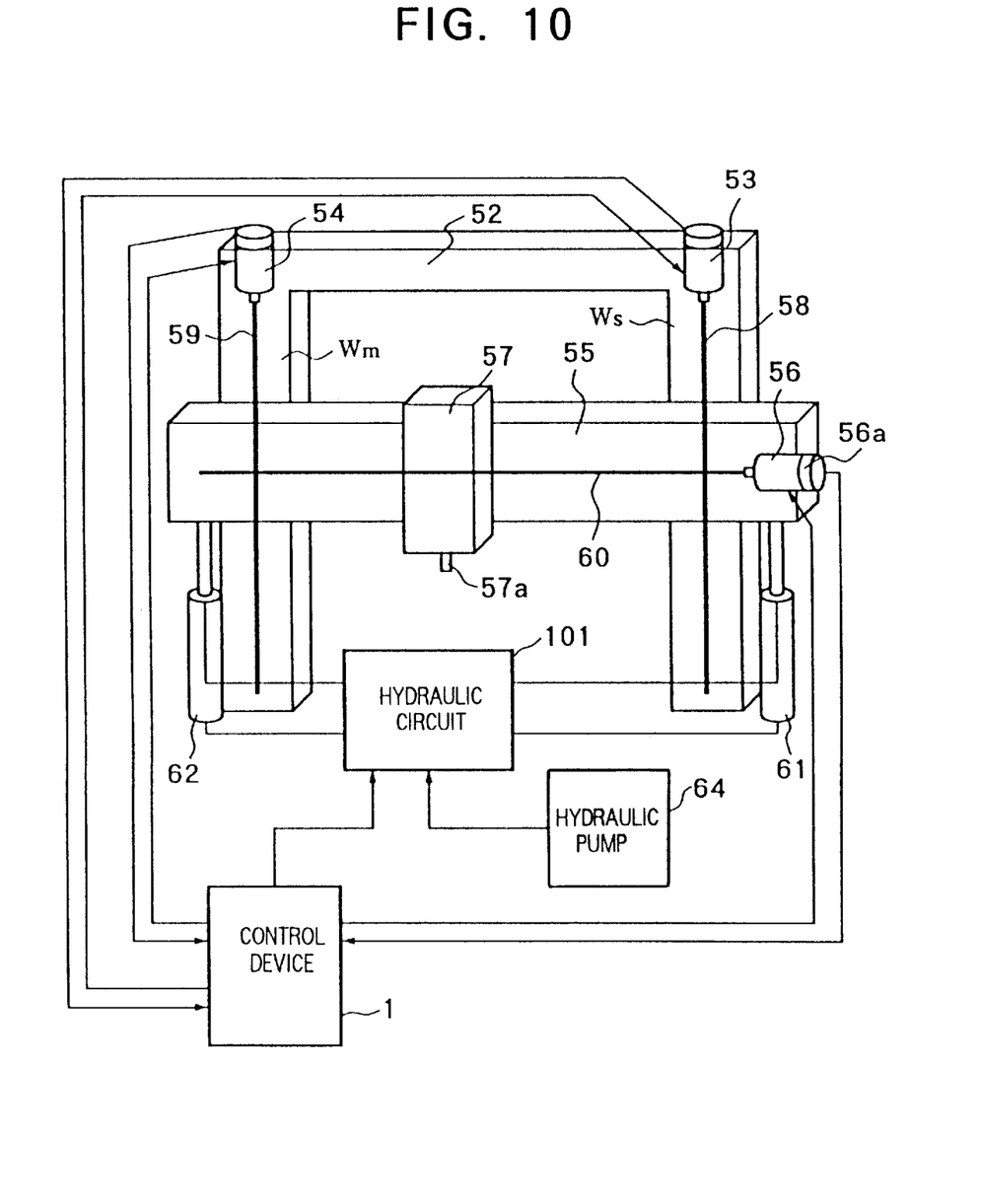
FIG. 10 is an explanatory view of an overall configuration in another embodiment of the position control system according to the present invention.

Next, FIG. 10 is an explanatory view of the overall configuration of another embodiment of the position control system according to the present invention.

In the position control system according to the present invention, as shown in FIG. 3, it is possible to omit the hydraulic cylinders 61 and 62 supporting the two ends of the Y-shaft 55.

However, similar to the conventional device, it is also possible to support the two ends of the Y-shaft 55 by the hydraulic cylinders 61 and 62, make the hydraulics of the hydraulic cylinders 51 and 62 constant, and use them for cancelling the weight of the Y-shaft 55.

As the control device 1 at this time, one of the same configuration as the configurations shown in FIG. 4, FIG. 8, and FIG. 9 can be used.

The hydraulic control circuit 101 necessary in this case does not have to perform fine adjustment of the hydraulic as in the related art and is a circuit having a simple configuration.

In the configuration of FIG. 3, it is necessary to make the size of the Wm axis servo motor 54 and the Ws axis servo motor 53 driving the Y-shaft 55 in the vertical direction larger than that of the related art, but by adopting a configuration as in FIG. 8, it is not necessary to make the size large, so an already existing machine tool etc. can be used.

As explained above, by the position control system according to the present invention, the precision of the correction of the positional deviation of the position control system in which the positional deviation between the position of the control point on the controlled object and the target position changes in accordance with a change of the relative positional relationship between mechanically related control axes can be improved.

Further, in the position control system according to the present invention, the correction data is measured in advance. In the actual position control, the positional deviation correction data is subjected to straight line interpolation to calculate the correction of the positional deviation. Accordingly, the correction data to be held can be reduced to the lowest limit.

Further, in the position control system according to the present invention, the correction data can be easily corrected and the adjustment of the correction of the positional deviation is easy.

While the invention has been described with reference to specific embodiments chosen for purposes of illustration, it should be apparent that numerous modifications could be made thereto by those skilled in the art without departing from the basic concept and scope of the invention.

What is claim is:

1. A position control apparatus for controlling a position of a first moveable member in vertical and horizontal directions, the first moveable member being moveable on a second moveable member by a first driving means along a horizontal axis, the second moveable member having two ends engaged to two vertical members and vertically moveable by second and third driving means along the vertical members, the position control apparatus comprising:

a first servo controlling means for controlling the position of the first moveable member on the second moveable member in response to a first position control command, the first position control command for moving the first moveable member along the horizontal axis;

a common position instructing means for outputting a second position control command;

second and third servo controlling means for respectively controlling vertical positions of the two ends of the second moveable member along the two vertical members;

a first vertical position correction means for calculating a first vertical position correction signal in response to the position of the first moveable member, the first vertical position correction signal and the second position control command being cooperatively applied to the second servo controlling means for moving one of the two second moveable member ends along a corresponding one of the two vertical member; and a second vertical position correction means for calculating a second vertical position correction signal in response to the position of the first moveable member, the second vertical position correction signal and the second position control command being cooperatively applied to the third servo controlling means for moving the other second movable member end along the other vertical axis.

2. A position control apparatus according to claim 1, wherein each of the first to third driving means comprises:

a screw shaft screwed into screw portions formed in the first moveable member and second moveable member;

a servo motor rotating the screw shaft; and a rotation detector detecting rotation of the driving member.

3. A position control apparatus according to claim 1, wherein the first vertical position correction means comprises:

a first vertical position correction data calculation means holding a first position correction data which is a first function of a first position of the first moveable member from the one end of the second moveable member and calculating the first vertical position correction signal using the first function in response to the first position of the first moveable member; and wherein the second vertical position correction means comprises a second vertical position correction data calculation means holding a second position correction calculation data which is a second function of a second position of the first moveable member from the other end of the second moveable member and calculating the second vertical position correction signal using the second function in response to the second position of the first moveable member.

4. A position control apparatus according to claim 3, wherein the first function is defined as a plurality of first position correction data at a plurality of first position of the first moveable member and the first vertical position correction data calculation means calculates the first vertical position correction signal by interpolating two adjacent first position correction data in response to the first position of the first moveable member; and wherein the second function is defined as a plurality of second position correction data at a plurality of second positions of the first moveable member and the second vertical position correction data calculation means calculates the second vertical position correction signal by interpolating two adjacent second position correction data in response to the second position of the first moveable member.

5. A position control apparatus according to claim 3, wherein the first vertical position correction means further comprises:

a first adding means for adding the second position control command output from the common position instructing means and the first calculated vertical position correction signal calculated at the first vertical position correction data calculation means and outpouring an added value as a corrected second position control command to the second servo controlling means; and wherein the second vertical position correction means further comprises a second adding means for adding the second position control command output from the common position instructing means and the second calculated vertical position correction signal calculated at the second vertical position correction data calculation means and outputting a second added value as a corrected third position control command to the third servo controlling means.

6. A position control apparatus according to claim 3, wherein the first vertical position correction means further comprises:

a first adding means for adding a second position signal output from a second position sensor and a first calculated vertical position correction signal calculated at the first vertical position correction data calculation means and outputting an added value as a corrected second feedback position signal to the second servo controlling means; and wherein the second vertical position correction means further comprises a second adding means for adding a third position signal output from a third position sensor and a second calculated vertical position correction signal calculated at the second vertical position correction data calculation means and outputting a second added value as a corrected third feedback position signal to the third servo controlling means.

7. A position control apparatus according to claim 3, wherein the first vertical position correction means further comprises a first adding means for adding a second position signal output from a second position sensor and a first calculated vertical position correction signal calculated at the first vertical position correction data calculation means and outputting an added value as a corrected second feedback position signal to the second servo controlling means, and wherein the second vertical position correction means further comprises:

a second adding means for adding a third position signal output from a third position sensor and a second calculated vertical position correction signal calculated at the second vertical position correction data calculation means and outputting a second added value as a corrected third feedback position signal to the third servo controlling means; and a third adding means for adding the corrected second feedback position signal and the corrected third feedback position signal, producing an added signal thereby;

a gain adjusting means for adjusting a gain of the added signal output from the third adding means, producing a gain adjusted signal thereby; and a fourth adding means for adding the second position control command output from the common position instructing means and the gain adjusted signal output from the gain adjusting means and outputting a third added value as a corrected third position control command to the third servo controlling means.

8. A position control apparatus according to claim 3, wherein a first vertical position correction means further comprises a first adding means for adding the second position control command output from the common position instructing means and the first calculated vertical position correction signal calculated at the first vertical position correction data calculation means and outputting an added value as a corrected second position control command to the second servo controlling means; and wherein the second vertical position correction means further comprises:

a second adding means for adding the first calculated vertical position correction signal and a second position signal output from a second position sensor, producing a first output signal thereby;

a third adding means for adding a second calculated vertical position correction signal and a third position signal output from a third position sensor, producing a second output signal thereby;

a fourth adding means for adding the first and second output signals from the second and third adding means, producing a third output signal thereby;

a gain adjusting means for adjusting a gain of the third output signal from the fourth adding means, producing a gain adjusted signal thereby;

a fifth adding means for adding the second position control command output from the common position instructing means and the gain adjusted signal output from the gain adjusting means, producing a fourth output signal thereby; and a sixth means for adding the fourth output signal from the fifth adding means and the second calculated vertical position correction signal calculated at the second vertical position correction data calculation means and outputting a second added value as a corrected third position control command to the third servo controlling means.

9. A position control system comprising:

a first moveable member;

a first driving means communicating with the first movable member and for moving the first moveable member;

a second moveable member, the first movable member being slidably attached to the second moveable member;

second and third driving means communicating with the second movable member and for moving the second movable member;

the first moveable member being moveable on the second moveable member by the first driving means along a horizontal axis, the second moveable member having two ends engaged to two vertical members and vertically moveable by the second and third driving means along the vertical members; and a position control apparatus for controlling a position of the first moveable member in vertical and horizontal directions comprising:

a first servo controlling means for controlling the position of the first moveable member on the second moveable member in response to a first position control command, the first position control command for moving the first moveable member along the horizontal axis;

a common position instructing means for outputting a second position control command;

second and third servo controlling means for respectively controlling vertical positions of the two ends of the second moveable member along the two vertical members;

a first vertical position correction means for calculating a first vertical position correction signal in response to the position of the first moveable member, the first vertical position correction signal and the second position control command being cooperatively applied to the second servo controlling means for moving one of the two second movable member ends along a corresponding one of the two vertical members; and a second vertical position correction means for calculating a second vertical position correction signal in response to the position of the first moveable member, the second vertical position correction signal and the second position control command being cooperatively applied to the third servo controlling means for moving the other second movable member end along the other vertical member.

10. A position control apparatus for controlling a position of a first moveable member in vertical and horizontal directions, the first moveable member being moveable on a second moveable member by a first driving means along a horizontal axis, the second moveable member having two ends engaged to two vertical members and vertically moveable by second and third driving means along the vertical members, the two ends of the second moveable member being supported by liquid pressure supporting means for cancelling weight associated with the first and second moveable members, the position control apparatus comprising:

a first servo controlling means for controlling the position of the first moveable member on the second moveable member in response to a fist position control command, the first position control command for moving the first moveable member along the horizontal axis;

a common position instructing means for outputting a second position control command;

second and third servo controlling means for respectively controlling vertical positions of the two ends of the second moveable member along the two vertical members;

a first vertical position correction means for calculating a first vertical position correction signal in response to the position of the first moveable member, the first vertical position correction signal and the second position control command being cooperatively applied to the second servo controlling means for moving one of the two second movable member ends along a corresponding one of the two vertical member; and a second vertical position correction means for calculating a second vertical position correction signal in response to the position of the first moveable member, the second vertical position correction signal and the second position control command being cooperatively applied to the third servo controlling means for moving the other second movable member end along the other vertical axis.

11. A position control apparatus according to claim 10, wherein each of the first to third driving means comprises:

a screw shaft screwed into screw portions in the first moveable member and second moveable member;

a servo motor rotating the screw shaft; and a rotation detector detecting rotation of the driving means.

12. A position control apparatus according to claim 10, wherein the first vertical position correction means comprises:

a first vertical position correction data calculation means holding a first position correction data which is a first function of a first position of the first moveable member from the one end of the second moveable member and calculating the first vertical position correction signal using the first function in response to the first position of the first moveable member; and wherein the second vertical position correction means comprises a second vertical position correction data calculation means holding a second position correction calculation data which is a second function of a second position of the first moveable member from the other end of the second moveable member and calculating the second vertical position correction signal using the second function in response to the second position of the first moveable member.

13. A position control apparatus according to claim 12, wherein the first function is defined as a plurality of first position correction data at a plurality of first positions of the first moveable member and the first vertical position correction data calculation means calculates the first vertical position correction signal by interpolating two adjacent first position correction data in response to the first position of the first moveable member; and wherein the second function is defined as a plurality of second position correction data at a plurality of second positions of the first moveable member and the second vertical position correction data calculation means calculates the second vertical position correction signal by interpolating two adjacent second position correction data in response to the second position of the first moveable member.

14. A position control apparatus according to claim 12, wherein the first vertical position correction means further comprises:

a first adding means for adding the second position control command output from the common position instructing means and the first calculated vertical position correction signal calculated at the first vertical position correction data calculation means and outputting an added value as a corrected second position control command to the second servo controlling means; and wherein the second vertical position correction means further comprises a second adding means for adding the second position control command output from the common position instructing means and the second calculated vertical position correction signal calculated at the second vertical position correction data calculation means and outputting a second added value as a corrected third position control command to the third servo controlling means.

15. A position control apparatus according to claim 12, wherein the first vertical position correction means further comprises:

a first adding means for adding a second position signal output from a second position sensor and a first calculated vertical position correction signal calculated at the first vertical position correction data calculation means and outputting an added value as a corrected second feedback position signal to the second servo controlling means; and wherein the second vertical position correction means further comprises a second adding means for adding a third position signal output from a third position sensor and a second calculated vertical position correction signal calculated at the second vertical position correction data calculation means and outputting a second added value as a corrected third feedback position signal to the third servo controlling means.

16. A position control apparatus according to claim 12, wherein the first vertical position correction means further comprises a first adding means for adding a second position signal output from a second position sensor and a first calculated vertical position correction signal calculated at the first vertical position correction data calculation means and outputting an added value as a corrected second feedback position signal to the second servo controlling means, and wherein the second vertical position correction means further comprises:

a second adding means for adding a third position signal output from a third position sensor and a second calculated vertical position correction signal calculated at the second vertical position correction data calculation means and outputting a second added value as a corrected third feedback position signal to the third servo controlling means;

a third adding means for adding the corrected second feedback position signal and the corrected third feedback position signal, producing an added signal thereby;

a gain adjusting means for adjusting a gain of the added signal output from the third adding means, producing a gain adjusted signal thereby; and a fourth adding means for adding the second position control command output from the common position instructing means and the gain adjusted signal output from the gain adjusting means and outputting a third added value as a corrected third position control command to the third servo controlling means.

17. A position control apparatus according to claim 12, wherein the first vertical position correction means further comprises a first adding means for adding the second position control command output from the common position instructing means and a first calculated vertical position correction signal calculated at the first vertical position correction data calculation means and outputting an added value as a corrected second position control command to the second servo controlling means; and wherein the second vertical position correction means further comprises:

a second adding means for adding the first calculated vertical position correction signal and a second position signal output from a second position sensor, producing a first output signal thereby;

a third adding means for adding a second calculated vertical position correction signal and a third position signal output from a third position sensor, producing a second output signal thereby;

a fourth adding means for adding the first and second output signals from the second and third adding means, producing a third output signal thereby;

a gain adjusting means for adjusting a gain of the third output signal from the fourth adding means, producing a gain adjusted signal thereby;

a fifth adding means for adding the second position control command output from the common position instructing means and the gain adjusted signal output from the gain adjusting means, producing a fourth output signal thereby; and a sixth adding means for adding the fourth output signal from the fifth adding means and the second calculated vertical position correction signal calculated at the second vertical position correction data calculation means and outputting a second added value as a corrected third position control command to the third servo controlling means.

18. A position control system comprising:

a first moveable member;

a first driving means communicating with the first movable member and for moving the first movable member;

a second moveable member, the first moveable member being slidably attached to the second movable member, the second moveable member having two ends;

second and third driving means communicating with the second movable member and for moving the second movable member;

the two ends of the second moveable member being supported by liquid pressure supporting means for cancelling weight associated with the first and second moveable members;

the first moveable member being moveable on the second moveable member by the first driving means along a horizontal axis, the two ends of the second moveable member engaged to two vertical members and vertically moveable by the second and third driving means along the vertical members; and a position control apparatus for controlling a position of the first moveable member in vertical and horizontal directions, comprising:

a first servo controlling means for controlling the position of the first moveable member on the second moveable member in response to a first position control command, the first position control command for moving the first moveable member along the horizontal axis;

a common position instructing means for outputting a second position control command;

second and third servo controlling means for respectively controlling vertical positions of the two ends of the second moveable member along the two vertical members;

a first vertical position correction means for calculating a first vertical position correction signal in response to the position of the first moveable member, the first vertical position correction signal and the second position control command being cooperatively applied to the second servo controlling means for moving one of the two second movable member ends along a corresponding one of the two vertical members; and a second vertical position correction means for calculating a second vertical position correction signal in response to the position of the first moveable member, the second vertical position correction signal and the second position control command being cooperatively applied to the third servo controlling means for moving the other second movable member end along the other vertical member.

19. A method for controlling a position of a first moveable member in vertical and horizontal directions, the first moveable member being moveable on a second moveable member by a first driving means along a horizontal axis, the second moveable member having two ends engaged to two vertical members and vertically moveable by second and third driving means along the vertical members, the method comprising:

generating a first position control command and controlling the position of the first moveable member on the second moveable member in response to the first position control command;

generating a second position control command;

calculating a first vertical position correction signal in response the position of the first moveable member;

moving one of the two second moveable member ends along a corresponding one of the two vertical members in response to the first vertical position correction signal and the second position control command;

calculating a second vertical position correction signal in response to the position of the first moveable member; and moving the other second movable member end along the other vertical members in response to the second vertical position correction signal and the second position control command.

* * * * *